UNITED STATES PATENT OFFICE.

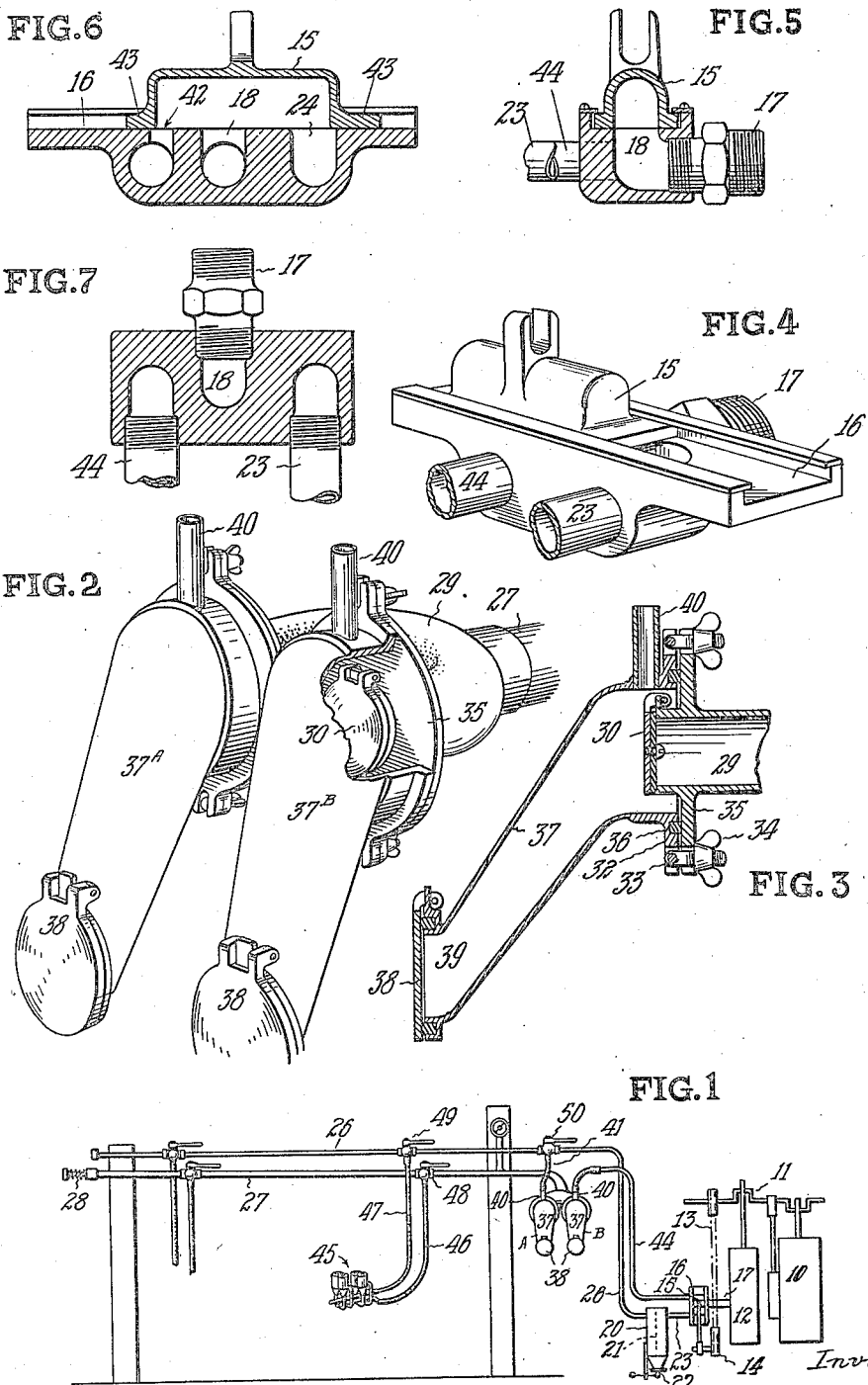

SIMON MACDONALD BOWER, OF WOOLLAHRA, NEAR SYDNEY, NEW SOUTH WALES, AUSTRALIA.

COW-MILKING MACHINE.

1,332,318.   Specification of Letters Patent.   Patented Mar. 2, 1920.

Application filed October 14, 1919. Serial No. 330,616.

*To all whom it may concern:*

Be it known that I, SIMON MACDONALD BOWER, subject of the King of Great Britain and Ireland, residing at Riddell street, Bellevue Hill, Woollahra, near Sydney, in the county of Cumberland and State of New South Wales, Commonwealth of Australia, have invented certain new and useful Improvements in Cow-Milking Machines, of which the following is a specification.

This invention relates to cow milking machines of the type in which teat cups are connected to a milk pipe in which a condition of vacuum is maintained at an approximately uniform depression, while the inflation jackets of the teat cups are subjected to oscillating vacuum with the object of causing the inflation tubes therein to collapse and expand alternately at predetermined intervals, and thereby massage the teat, simulating the action of the hand in the hand milking operation.

In apparatus according to this invention the milk pipe terminates in the head of a dual lock chamber automatic milk releaser; one lock chamber of said releaser is connected to one port of a pulsator, and the other lock chamber is connected through the air main to a moisture trap and thence to another port of the pulsator. The pulsator is a three port valve; its end ports forming terminals respectively for the connections before mentioned, while its intermediate port is in permanent communication with the receiver of a vacuum pump. The moving element of the valve, which may be constructed as a slide, a piston, or a rocker, is constructed with considerable lead, so that for a brief period during its reversal and before an end port is opened to atmosphere both end ports are connected to the vacuum pump receiver through the middle port. Overlapping vacuum is therefore established alternately in the two pipe connections, and during the period of overlap the head valves of the two trap chambers of the releaser are open, so that leak air is educted through them and a condition of vacuum maintained in the milk pipe. When vacuum is broken or reduced in either pipe connection by the opening of an end port of the pulsator to atmosphere, the head valve in the corresponding releaser lock chamber closes automatically, so that while vacuum is broken in the release chamber to which the open pipe is connected, air is not admitted therefrom into the milk pipe. Owing to the pulsator lead, a condition of vacuum is always established momentarily in the two lock chambers simultaneously at the change over position, the lock chambers receiving air alternately to break the vacuum in them, and when vacuum is broken in them their foot valves are permitted to fall open and the milk contained in them respectively then flows out by gravity. Upon the reëstablishing of a condition of vacuum in a released chamber, its foot valve closes, and when the vacuum depression attains equality with the depression in the milk pipe circuit, the head valve opens again, allowing milk to flow from the milk pipe into the lock chamber, which is thus reopened to that circuit. The evacuation of air from and readmission of air into each one alternately of a pair of lock chambers which are respectively junctioned at their heads through a common receiving connection to a milk pipe in which an approximately constant vacuum is contained is the principle underlying the invention. By that device each lock chamber of the pair which jointly constitute a releaser is in turn automatically permitted to release a charge of milk which has passed into it from the milk pipe, is isolated from the milk drawing circuit during such release action, and is reopened to that circuit as soon as a vacuous condition is reëstablished in it. By making the vacuum period in the respective lock chambers overlap, a continuous vacuum is maintained in the milk pipe, as both lock chambers are then together held in communication with it during the dwell while reversal is taking place.

In the accompanying explanatory drawings, Figure 1 is a semi-diagrammatic view of a two cow milking installation; Fig. 2 is a perspective view of the twin lock chamber releaser; Fig. 3 is a longitudinal vertical section through one of the releaser lock chambers, showing its connection to the milk pipe; Fig. 4 is a perspective view of a D-valve type of pulsator; Fig. 5 is a transverse section through same; Fig. 6 is a longitudinal vertical section; and Fig. 7 is a horizontal section below the face of the pulsator which is shown in Fig. 4.

10 represents an engine or other motor arranged to turn the countershaft 11, from which the pump 12 is driven by crank, belt, or other transmission. The shaft 11 also serves by means of a belt 13 and crank wheel 14 to reciprocate the slide 15 on the bed 16 of the pulsator. 17 is a suction pipe connecting the middle port 18 of the pulsator with the vacuum pump 12 or with a vacuum receiver (not shown) located intermediate said pump 12 and said pipe 17. 20 is a moisture trap; it consists of a vessel having a curtain diaphragm 21 and a counter-balanced foot valve 22. Into one side of it is connected a pipe 23 which leads to one of the outer ports of the pulsator. Into its other side the air main 26 is connected. This main 26 runs the length of the milking shed, and its connection to the moisture trap 20 may be at one end of it or at some point intermediate its ends. 27 is the milk pipe. 28 is a vacuum relief valve at the end of or at some other point in the milk pipe, the function of this valve being, as is well known, to maintain uniformity in the vacuum depression in the milk pipe 27. At an end or intermediate point in the milk pipe 27 said pipe is connected into the fork of a branch 29, the ends of said branch respectively carrying the upper ends of the two lock chambers, which function jointly as a milk releaser. At each end of the branch 29 a clack check valve 30 is fitted. This valve is of the well known pendent flap type adapted for easy removal for cleaning purposes; the valve seat is a plain ring seat, also adapted to facilitate cleaning. The lock chambers are formed with collars 32 fitted with swing bolts 33 which carry wing nuts 34 adapted to secure the lock chambers up to the carrier flanges 35 on the branch ends 29. 36 are packing rings. Each lock chamber 37 is a pocket preferably disposed diagonally, and carried by its collar 32; at its upper end the clack check valve 30 governs communication with the branch 29 and at its foot a similar clack valve 38 closes against its mouth 39 and governs the delivery of the released milk.

For the purpose of clarity of description the dual lock chambers which form the releaser are respectively referred to as chambers A and B.

The pulsator port 42 is connected by the pipe 44 to the air pipe 40 on the head of the releaser chamber B. The air pipe 40 on the releaser chamber A is connected by the pipe 41 to the air main 26, a valve such as 50 being provided to close this connection when required.

The teat cups 45 are connected by the flexible pipe 46 to the milk pipe 27, preferably through a cock 48, and the teat cup inflation casings are similarly connected by a flexible pipe 47 to the air main 26, preferably through a valve connection such as 49.

The branch 29 which connects the dual lock chamber heads to the milk pipe 27 does not function as an independent chamber, it functions only as a connection from the head valve 30 to the milk pipe. In practice, the releaser chambers A and B might be mounted directly and separately on the milk pipe without any intermediate fitting such as the branch 29.

In operation, vacuum up to a predetermined depression is established by the pump 12 through the pipe connection 17 at the center port 18 of the pulsator. As the pulsator slide 15 is reciprocated over the ported bed or face 16, the center port 18 is placed in communication alternately with the side ports 24 and 42. It will be noted that the slide 15 is formed with lead, so that before its lips 43 close over either end port, the other end port is opened up to communication with the port 18. At each reversal, therefore, during a brief period, both end ports 24 and 42 are in communication with the center port 18, and through it with the vacuum pipe 17. At the completion of each stroke, the end ports 24 and 42 are alternately opened to atmosphere, and air then passes into the pipes 23 and 44 alternately, breaking the vacuum therein and in the parts to which they are connected. Oscillating vacuum, that is to say an alternating condition between full working vacuum on the one hand and approximation to atmospheric pressure on the other, exists in these pipes and the parts connected thereto. The milk pipe 27 is evacuated of air through the pipes 44 and 23 as will be hereinafter described, while the air main 26 is operated under a condition of oscillating vacuum.

When the pulsator port 42 is opened to the port 18 through the slide 15, a condition of vacuum is caused to exist in the lock chamber B. Atmospheric pressure then acting against the foot valve 38 holds said valve tightly on its seating, and as soon as the evacuation of air from the chamber B has attained the point at which there is an equality of pressure in the chamber B and in the milk pipe branch 29, the head check valve 30 is free to fall open and allow milk to pass from the branch 29 into the chamber B. Said milk is retained in that chamber until the vacuum is broken in it. Any air leakage into the milk pipe is evacuated via the branch 29 and the chamber B through the air tube 40 therein. As the opening movement of the pulsator slide 15 continues, the chamber A is simultaneously opened to vacuum through the air pipe 26, the moisture trap 20, and the pipe 23 leading to the valve port 24, and while vacuum thus exists simultaneously in the two releaser chambers, both head valves 30 are free while both foot valves 38 are held closed by external atmospheric pressure acting against them. When the pulsator valve reaches its reverse position it opens the port 42 to atmosphere, allowing air to rush in to the pipe 44 and break the vacuum in the chamber B. Immediately the vacuum depression is lessened, the valve 30 is closed tightly against its seat by the superplus of pressure acting outside it, and when the vacuum has been nearly or completely broken in the chamber B, the foot valve 38, being no longer sustained by external atmospheric pressure falls open, and the released milk runs from the chamber B into a vessel placed to receive it. In the reversing movement of the valve, vacuum is reëstablished in the chamber B before vacuum is broken in the chamber A by the admission of air through the port 24 into the air main 26 and thence through the pipe 41 into said chamber A. As soon as the vacuum has been reduced in the chamber A, its head valve 30 closes, and when the atmospheric condition has been nearly or quite reëstablished in the chamber A its foot valve 38 opens and the released milk which was carried in the chamber A is then discharged by gravity into the receiving vessel. The dual lock chambers thus co-act, so that while one is receiving milk from the milk pipe the other is discharging the released milk contained in it, the releasing action being effected by the oscillation of the vacuum in the two chambers, whereby the head and foot valves are caused to open and close in correct timing, prohibiting inflow of air via either chamber into the milk pipe. Any moisture accidentally drawn into the air main 26 is intercepted in the save-all 20. As this vessel is fitted with a bottom drop valve, water collected in it is free to flow out through said valve whenever an atmospheric condition is reëstablished in it allowing said water to force the valve open by gravity. When a condition of vacuum exists in the air main circuit, the foot valve 22 is held closed and any water then entrained with the air and drawn through the air main is intercepted.

What I claim as my invention and desire to secure by Letters Patent is:—

A milking apparatus including in combination a pair of pipes, means for alternately establishing an overlapping vacuum in said pipes, a milk pipe, and an automatic milk releaser in connection with the milk pipe and composed of a forked branch connected to the milk pipe and having flanges on its side portions, a pair of releaser chambers inclosing the outer portions of the forked branch and having their inner portions flanged and arranged in abutting relation with the flanges on the outer portions of the forked branch, means for detachably fastening the flanged portions of the branch and the chambers together, check valves at the outer edges of the side portions of the branch and the chambers, air pipes leading from the chambers, and pipe connections between one of said vacuum pipes and one of said air pipes and between the other of said vacuum pipes and the other of said air pipes.

In testimony whereof I affix my signature.

SIMON MACDONALD BOWER.